United States Patent [19]

Yamada et al.

[11] Patent Number: 4,636,885
[45] Date of Patent: Jan. 13, 1987

[54] SERVO SYSTEM FOR A MAGNETIC DISK MEMORY HAVING SPIRAL TRACKS

[75] Inventors: Takehito Yamada, Yokohama; Toshihiro Sugaya, Tokyo, both of Japan

[73] Assignee: Kabushiki Kaisha Toshiba, Kawasaki, Japan

[21] Appl. No.: 807,998

[22] Filed: Dec. 12, 1985

[30] Foreign Application Priority Data

Dec. 18, 1984 [JP] Japan .................. 59-267172

[51] Int. Cl.$^4$ .......................... G11B 5/55; G11B 5/56
[52] U.S. Cl. ........................................ 360/78; 360/77
[58] Field of Search ..................... 360/77, 78

[56] References Cited

U.S. PATENT DOCUMENTS

| | | |
|---|---|---|
| 4,352,131 | 9/1982 | Van Herk et al. ........... 360/78 |
| 4,363,116 | 12/1982 | Kleuters et al. ............ 360/77 |
| 4,405,956 | 9/1983 | Marshall ..................... 360/78 |
| 4,419,700 | 12/1983 | Ragle et al. ................. 360/77 |
| 4,502,082 | 2/1985 | Ragle et al. ................. 360/77 |

FOREIGN PATENT DOCUMENTS 59-165279  9/1959  Japan .

OTHER PUBLICATIONS

Nikkei Electronics "General Review on Floppy Disc with 3 to 3.5 Inches as a Base" Jun. 18, 1984, pp. 178–180.

Primary Examiner—George G. Stellar
Attorney, Agent, or Firm—Oblon, Fisher, Spivak, McClelland & Maier

[57] ABSTRACT

Disclosed is a disk memory having a plurality of data sectors and servo sectors each provided between adjacent data sectors, spiral tracks being formed in each data sector and each servo sector. Servo information patterns are formed in each servo sector. To cause a read/write head to trace spiral tracks, the phases of the servo patterns with respect to servo tracks are sequentially displaced, from the first servo sector to the final m-th servo sector, by a value obtained by dividing the track pitch of the servo tracks by the number of servo sectors. In the m-th servo sector a servo index used for detecting that the servo sector is formed. A disk device is also disclosed which performs tracking control for the head along the spiral tracks.

6 Claims, 7 Drawing Figures

SERVO SYSTEM FOR A MAGNETIC DISK MEMORY HAVING SPIRAL TRACKS

BACKGROUND OF THE INVENTION

The present invention relates to a servo system for a magnetic disk memory having spiral data tracks.

Generally, a magnetic disk device uses magnetic disks with concentrically formed data tracks. With this type of disk device, a read/write head stays on one track until the head is instructed to access another track. It is relatively easy, therefore, to perform positioning control of the head. Disks having concentrical data tracks are advantageous for easier realization of high-density tracks.

On the other hand, to write (read) a great amount of information, such as image information, on the concentrical tracks of a disk, track access control must be performed many times. Therefore, the writing (reading) of information cannot continuously be performed. A relatively long period of time is required to gain access to tracks, resulting in a substantial reduction in the data transfer rate.

Taking into consideration the disadvantage of concentric-track disks, forming a spiral track on a disk has been proposed. Since, in the case of a spiral track disk, the data track is continuous on the disk, and repeated access to the track is not required in writing and reading image information. This enables continuous writing of information on the disk. Further the data transfer rate is not lowered.

In a conventional disk device with a spiral-track disk, the head is simply moved in the radial direction of the disk. Therefore, it is difficult to move the head to a desired position on a track to write and read information. In other words, the conventional disk device cannot directly access the desired position on the data track. Further, the simple mechanical actuation of the head in the radial direction of disk requires some allowance for head tracking, making it difficul to increase track density.

An improved servo system for a disk having concentric tracks is disclosed in the copending U.S. patent application Ser. No. 469,144, entitled "SYSTEM FOR DETECTING POSITION OF A READ-WRITE HEAD IN SEEK OPERATION ON A DISK MEMORY HAVING DATA AND SERVO SECTORS", filed Feb. 23, 1983, now U.S. Pat. No. 4,499,511, and assigned to the same assignee as this application.

A further improved servo system for a disk having concentric tracks is disclosed in the copending U.S. patent application Ser. No. 586, 440, entitled "SYSTEM FOR DETECTING THE POSITION OF A READ-WRITE HEAD ON A DISK RECORDING MEDIUM HAVING DATA AND SERVO SECTORS", filed Mar. 5, 1984 and assigned to the same assignee as this application.

SUMMARY OF THE INVENTION

It is an object of this invention to provide an improved magnetic disk having spiral data tracks which enables direct access to information.

It is another object of this invention to provide an improved magnetic disk which enables high-density data tracks.

It is still another object of this invention to provide an improved magnetic disk device which uses a disk having spiral data tracks, which enables direct access to a desired position on a data track.

A disk, according to the invention, comprises a plurality of data sectors each having spiral data tracks; first to m-th servo sectors each having spiral servo tracks and located between adjacent data sectors; a servo index zone formed in association with the m-th servo sector for providing a reference position on the disk; and predetermined servo patterns formed in each of the servo sectors in the radial direction of the disk and adapted for positioning the head on the disk. The data tracks and servo tracks have a substantially equal track pitch. In each servo sector, the servo tracks are displaced by half the track pitch with respect to the data tracks in an adjacent data sector. Each of the servo patterns has a period which is an integral multiple of the servo track pitch. The phases of the servo patterns with respect to the servo tracks in the servo sectors are sequentially displaced, from the first servo sector to the m-th servo sector, by a value obtained by dividing the servo track pitch by the number of servo sectors.

A disk device for the disk of this invention is arranged to detect each of the servo sectors and the servo index in the m-th servo sector, and switch one of the position signals, which are obtained from servo information signals reproduced from the servo patterns and adapted for head positioning control, to another position signal in response to the detection of the servo index, so that the head stably tracks the spiral data tracks.

DETAILED DESCRIPTION OF THE PREFERRED EMBODIMENTS

Figure 1:
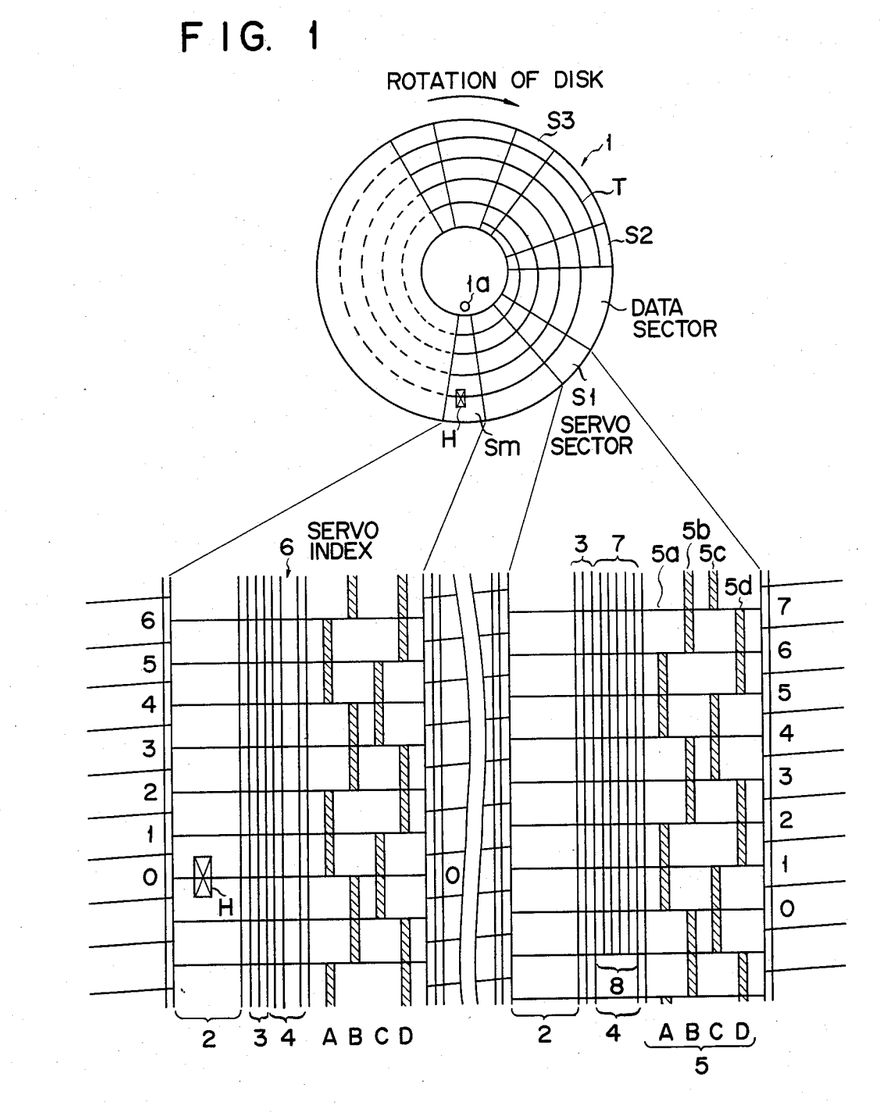
FIG. 1 schematically shows a disk according to the present invention, and servo patterns formed in servo sectors on the disk.

Referring to FIG. 1, a disk 1 according to the present invention comprises a data track T formed in a spiral from outside to inside, and a plurality of servo sectors Sl to Sm formed radially on the disk. Data track T is divided into sections by the servo sectors. In this specification, divided track sections on a circle are referred to as a single track, to which a track number is assigned. On each servo sector are formed identical servo patterns adapted for speed and positioning control of a read-write head H with respect to desk 1. In the m-th servo sector Sm a servo index pattern is formed, which provides a reference position for the spiral tracking control of head H.

In FIG. 1 the arrangements of first servo sector Sl and m-th servo sector Sm are shown. Each servo sector has an erase area 2 adapted for detecting the servo sector, AGC area 3 for adjusting a reproduced signal level, area 4 for detecting a guard zone, and servo pattern area 5 for detecting the position of read-write head H. A predetermined servo pattern information is previously embedded in servo pattern area 5. In this example, the servo pattern is formed of two-phase dibit pattern arrays, which each have a period of four tracks. Pattern arrays 5a and 5b of the first phase are displaced, by one track, from pattern arrays 5c and 5d of the second phase. In only m-th servo sector Sm is servo index pattern 6 formed between AGC area 3 and servo pattern area 5, which extends from guard zone detecting area 4 of servo sector Sm toward the inside of disk 1. The servo index pattern is adapted for detecting the m-th servo sector Sm, from which head H reproduces bit pattern "10". It should be noted that data zone area 7 provides bit pattern "11", and guard zone area 4 provides bit pattern of "00".

To detect the final servo sector Sm, a servo index hole 1a may be provided, which is formed in association with servo sector Sm, as shown in FIG. 1. Index hole 1a can be optically detected through a combination of a light source and a photo detector with the disk interposed therebetween. If necessary, the magnetic detecting system using the magnetic servo index pattern and the optical detecting system using the servo index hole may be combined to detect final servo sector Sm.

The servo tracks in the servo sectors and the data tracks in the data sectors have an equal track pitch and are displaced by half the track pitch, as shown. In general, while the width of head H is somewhat smaller than the track pitch, they are shown to be identical. When head H is in the on-track state, i.e., the head exactly traces a data track, the head traces the respective halves of the two adjacent servo tracks in a servo sector. It should also be understood that, in the servo sector, the servo tracks are spirally formed as in the data sector between servo sectors. In the figure, numbers 0 to 6 represent track numbers on the disk. Track 0 is the first effective data track on which data can be recorded, which is located closest to the outermost circumference of the disk. Namely, the data track sections extending from servo sector Sl completely around the disk represent one data track, to which a track number is allotted. In terms of the information to be recorded these data tracks together represent a single data track.

Figure 3:
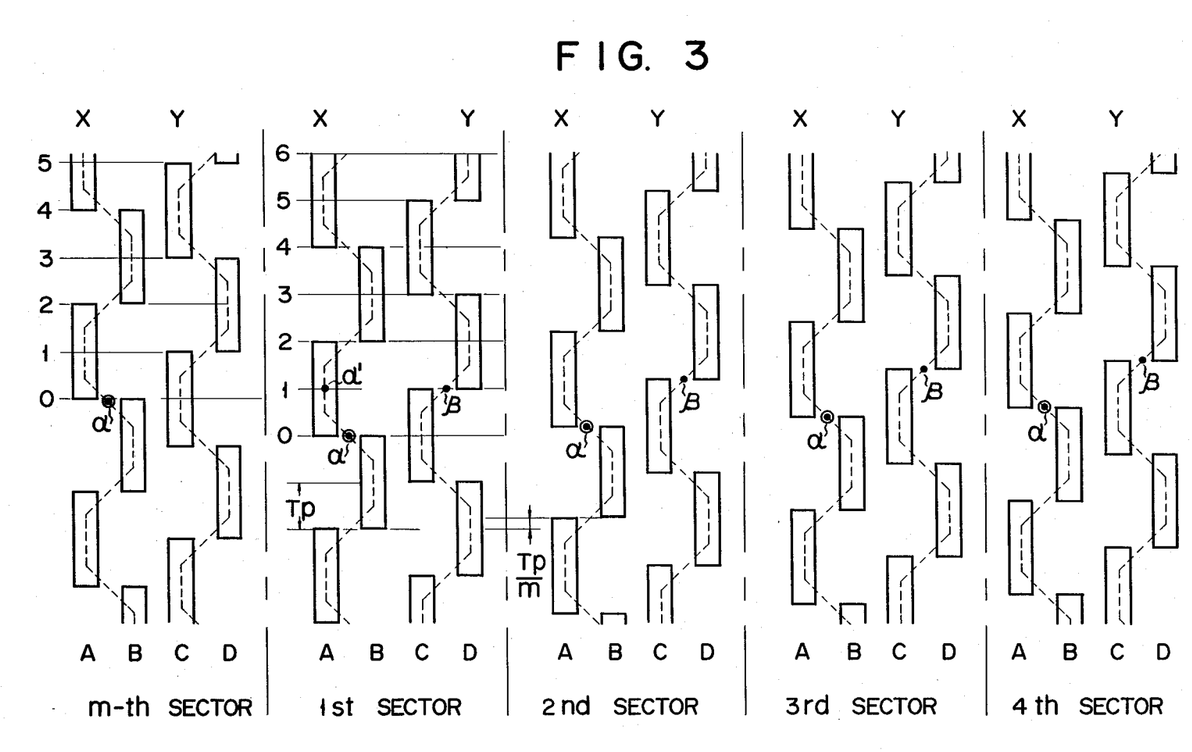
FIG. 3 shows servo information patterns formed in servo sectors according to the present invention.

As already mentioned, the servo sectors store identical servo pattern arrays. According to the present invention, to position head H on a certain track in the data tracks, corresponding servo pattern arrays in the servo sectors are formed such that they are sequentially displaced, from the first to m-th servo sectors Sl to Sm, by $\Delta Tp = Tp/m$, where Tp is the track pitch and m the number of servo sectors. For this reason, the corresponding servo pattern arrays in the m-th servo sector Sm and the first servo sector Sl are displaced by one track pitch, as seen in FIG. 3.

Figure 2:
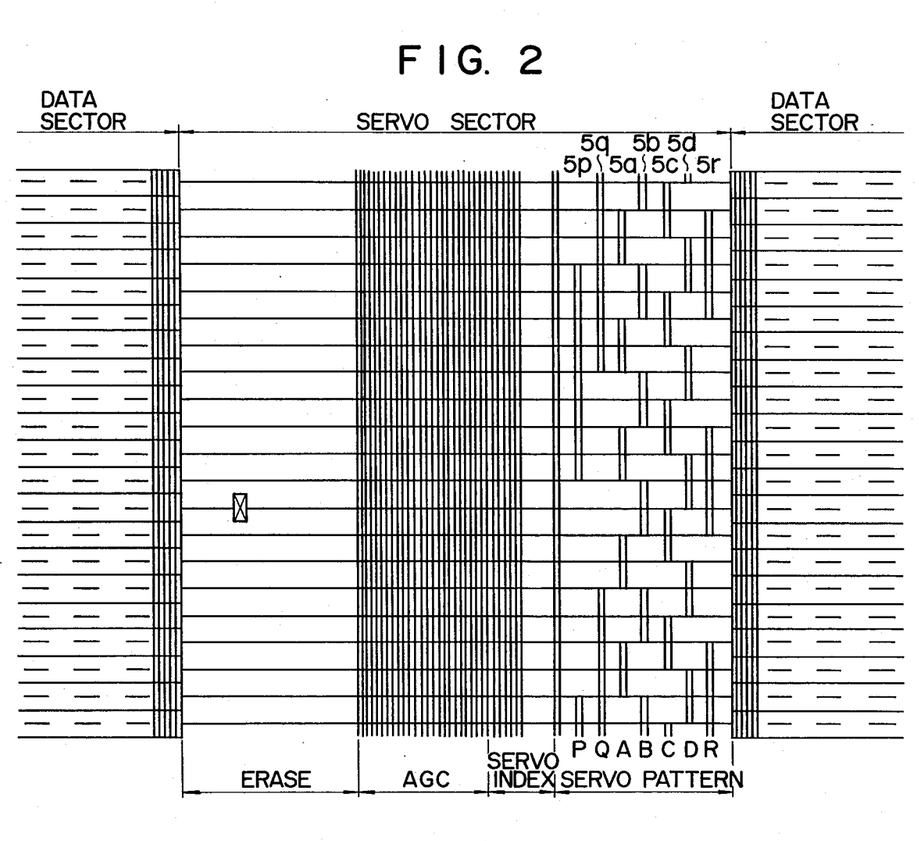
FIG. 2 shows a servo information pattern which can perform the speed and positioning control of the head.

The two-phase dibit servo pattern information so far described are particularly effective in realizing positioning control of head H. Due to the four-track period of the pattern information, however, the speed control of head H can be achieved at a speed of not more than 4 tracks/sector. For speed control at a higher speed, for example, 8 tracks/sector or 16 tracks/sector, it is preferable to use a servo pattern such as shown in FIG. 2. As shown, in addition to two-phase dibit pattern arrays 5a to 5d of a 4-track period, there are provided two dibit pattern arrays 5p and 5q of a 16-track period with a displacement of 4 tracks therebetween and a dibit servo pattern array 5r having an 8-track period and displacing two tracks with respect to dibit pattern arrays 5p and 5q.

Figure 4:
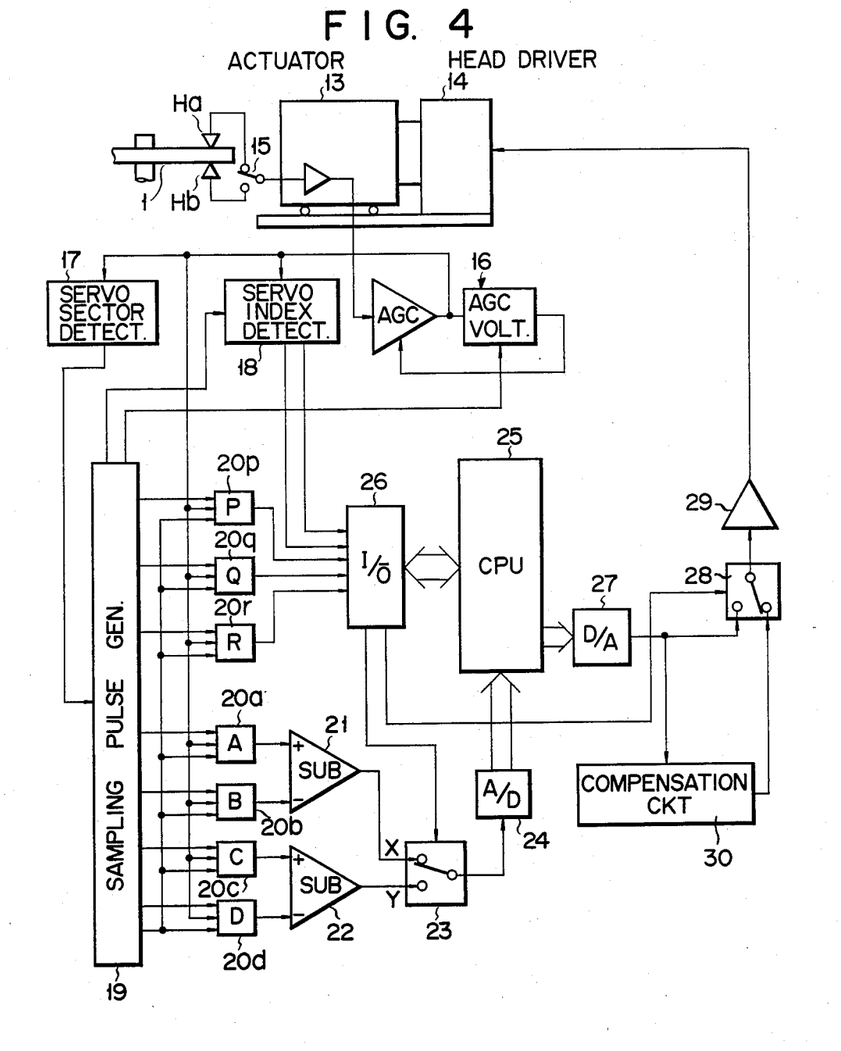
FIG. 4 shows an arrangement of a disk device for the disk according to the present invention.

FIG. 4 shows an arrangement of the disk device to position head H on a desired track on a disk constructed as mentioned above. The disk used in this device is of the type shown in FIG. 2. In this device, disk 1 is rotated at a predetermined rotating speed, and head H is moved in the radial direction of disk 1 to write and read data. Head H is supported by actuator 13, and moved by head drive 14 with a voice coil in the radial direction of disk 1.

If both sides of disk 1 are used for data write and read, two heads Ha and Hb are provided as shown. One of the output signals of heads Ha and Hb is selected by switch circuit 15, and applied to an AGC circuit 16 where the level of the reproduced signal is adjusted. The output signal of AGC circuit 16 is coupled to a servo sector detector 17 and a servo index detector 18. Detector 17 detects servo sectors Sl to Sm on the basis of erase areas 2, which each have a relatively long duration. Detector 18 is arranged to detect servo sector Sm on the basis of servo index pattern "10".

An output signal of servo sector detector 17 is coupled to a sampling pulse generator 19, which generates sampling pulses for sampling servo pattern information signals corresponding to the respective servo pattern arrays, with reference to the detect timing of the erase area. The sampling pulses are applied to corresponding sample/hold circuits 20a to 20d, and 20p to 20r to sample and hold reproduced signals A to D, and P to R, which respectively correspond to servo pattern arrays 5a to 5d and 5d to 5r in the servo sector, in the output signal of AGC circuit 16.

Sampling pulse generator 19 resets the sample/hold circuits at a predetermined timing, and responsds to servo sector detector 17 to enable servo index detector 18 to detect the servo index pattern with reference to the timing of detecting the servo sector. Circuit 19 functions to specify the timing for detecting the AGC pattern by AGC circuit 16.

Output signals A and B of sample/hold circuits 20a and 20b are applied to subtractor 21 to produce a position signal X ($=A-B$). Output signals C and D of sample/hold circuits 20c and 20d are applied to subtractor 22 to produce a position signal Y ($=C-D$). Position signals X and Y from subtractors 21 and 22 are selectively applied through switch circuit 23 to an analog-to-digital (A/D) converter 24 to be converted to digital position signals. The digital position signals are read into a microprocessor (CPU) 25.

Input/output (I/O) port 26 responds to servo index detector 18, and sample/hold circuits 20p to 20q provided for head speed control to communicate with CPU 25 regarding head speed control information which includes information on the present position of the head. I/O port 26 responds to an instruction from CPU 26 to control switch circuit 23 for selecting the position signal X or Y so that position signals X and Y are sequentially read into CPU 25.

Output information of CPU 25, containing speed control information and position control information of the head, is applied to digital/analog (D/A) converter 27. The converter converts the output information into an analog control signal. The analog control signal is applied through switch circuit 28 and power amplifier 29 to head drive mechanism 14, to perform head positioning control. D/A converter 27 is also coupled at the output to compensation circuit 30 for stabilizing the servo system in the position control mode. The output signals of compensation circuit 30 and D/A converter 27 are selectively applied to head drive mechanism 14 by switch circuit 28. Switch circuit 28 is switched by I/O port 26, and according to an instruction from CPU selects the output signal of D/A converter 27 to control the speed of the head. After the head speed control is completed, switch circuit 28 selects the output signal of compensation circuit 30 to control the head position. The position control following the speed control is performed by only servo information signals A to D. For head tracking control on the spiral tracks the servo information signals A to D are used.

The operation of the magnetic disk device thus arranged will be described in connection with the head positioning control based on the 2-phase dibit pattern. Thus, the servo sectors on the disk are assumed to have the configuration shown in FIG. 1.

Figure 5:
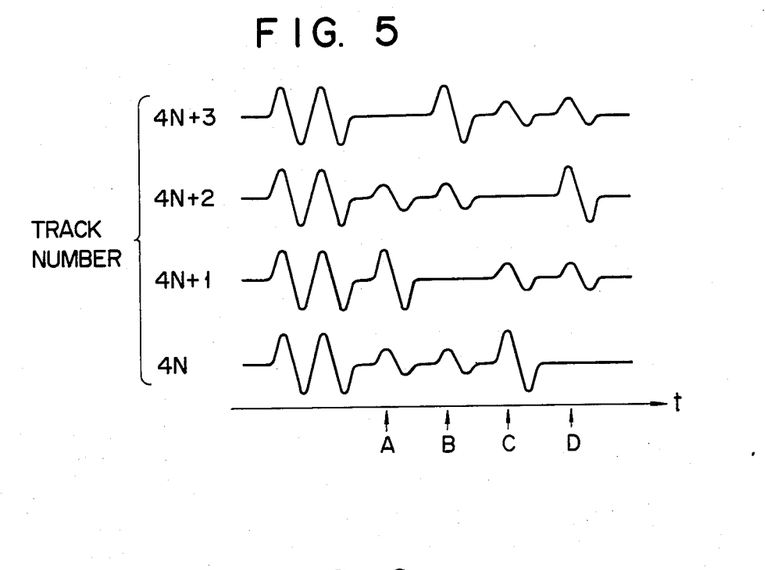
FIG. 5 shows a set of waveforms ot servo information signals picked up from different track positions by a read/write head.
Figure 6:
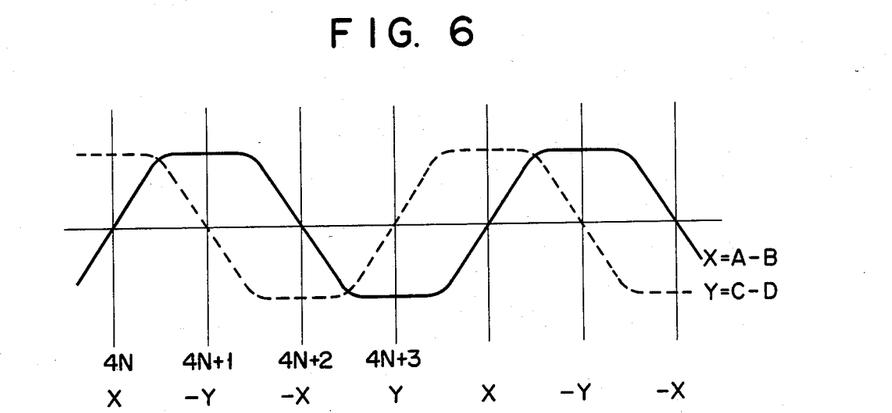
FIG. 6 shows waveforms of two position signals obtained from servo information signals, and used for head positioning control, as a function of track positions.

When head H traces data tracks 4N, 4N+1, 4N+2, 4N+3 (N=0, 1, 2, . . . ), the servo information signals, as shown in FIG. 5, corresponding to 2-phase dibit pattern arrays are picked up from the servo sectors, as described in the aforementioned copending patent applications. Servo pattern information signals A, B, C, D corresponding to servo pattern arrays 5a, 5b, 5c, 5d are sampled and held in sample/hold circuits 20a to 20d. By subtractors 21 and 22 position signals X (=A−B) and Y (=C−D) are formed. These position signals are illustrated in FIG. 6, as a function of head position on the disk as viewed in the radial direction of the disk. Since the 2-phase dibit pattern information has a period of four tracks, position signals X and Y have a period of four tracks. When the head is in the on-track state, X=0 or Y=0.

For the positioning control to stop the head at a desired position on the disk, the servo system in the present embodiment is arranged to stop the head when a positive-going ramp of position signal X or Y crosses a zero level. Accordingly, position signal X is used for the positioning control to stop the head on track 4N. To position the head on track 4N+1, an inverted signal −Y of position signal Y is used, as seen from FIG. 6. To position the head on track 4N+2, an inverted signal −X of position signal X is used. With respect to track 4N+3, the position signal Y is used. The selective use of the position signal for the head positioning control and the inversion of position signal are the same as in the aforementioned copending applications which disclose magnetic disk devices for driving disks with concentric tracks.

The servo system for driving the disk with spiral tracks according to the present invention will be described. A feature of the present invention exists in that when the servo index information of servo sector Sm is detected, the position signal to be used is switched from X to Y and vice versa, for the spiral tracking control of the head.

As shown in FIG. 3, in the present invention, the servo pattern information on the servo sectors are sequentially displaced from sector Sl to sector Sm by Tp/m. In this figure, position signals X and Y are depicted on the 2-phase dibit pattern array by dotted lines, for ease of understanding.

If the head is positioned at point α in first servo sector Sl, which corresponds to the center of a positive-going ramp of signal X, the head sequentially follows corresponding points α in the second, third, and following servo sectors in this order as the disk rotates. As a result, during one rotation of the disk, the head moves toward the center of the disk at a step of Tp/m, every time it passes a servo sector. In final servo sector Sm, the head arrives at point α which is apart from the corresponding point α in the first servo sector by (Tp−Tp/m) in the radial direction of the disk. When moving from final servo sector Sm to first servo sector Sl, the head arrives at a point α' which corresponds to the center on the positive peak of signal X, not the center of the positive-going ramp of signal X, as shown in FIG. 3. For this reason, if position signal X is used in servo sector Sm, the servo system becomes unstable, so that the head fails to stably trace the spiral track. It is noted that point α' of signal X corresponds to center point β on the negative-going ramp of signal Y. This fact indicates that when the head moves from sector Sm to sector Sl, if the position signal for the spiral tracking control of the head is changed from X to −Y, the head can be stably moved from first sector Sl to final sector Sm along a series of points β in these sectors. By appropriately switching the position signal in the first servo sector Sl every rotation of the disk, the head can move from the outside to the inside of the disk, while continuously tracing the spiral track. The switching of the position signal in sector Sl can be appropriately timed referring to the timing of detecting the servo index pattern in servo sector Sm.

In the disk according to the present invention, the track number changes from servo sector Sl, as described above. In the case of concentric tracks as described referring to FIG. 6, as for track 4N, position signal X is used for the head positioning control. As for track 4N+1, signal −Y is used. Further, as for tracks 4N+2 and 4N+3, signals −X and Y are selected for the positioning control. Also in the case of the spiral track, as for tracks 4N, 4N+1, 4N+2, and 4N+3, position signals X, −Y, −X and Y are used, as seen from FIG. 3. While in the case of the concentric track disk the position signal is switched when the head moves in the radial direction of the disk, that is, when the track number changes, in the case of the spiral track disk the position signal is switched in first servo sector Sl in response to the detection of the servo index pattern in servo sector Sm. The switching of the position signal is used for spiral tracking and positioning control.

The disk device shown in FIG. 4 can position the head in a desired position on a disk with spiral tracks, in the same manner as the servo system adapted for the concentric track disk as disclosed in the aforementioned copending applications. The servo operation performed in the disk device includes a spiral mode operation to spirally move the head as described above, in addition to the head speed control and the head positioning control. In operation, a target track is select-ed, and the target track information is externally input to CPU 25. Then the speed control is performed in which the head is moved toward the target track at a high speed using servo information signals A to D, and P to Q, in the manner disclosed in the aforementioned applications. When the head nears the target track, CPU 25 changes the operation of the servo system from speed control to positioning control using servo information signals A to D. It should be understood that the spiral tracking control of the head is performed during positioning control.

Figure 7:
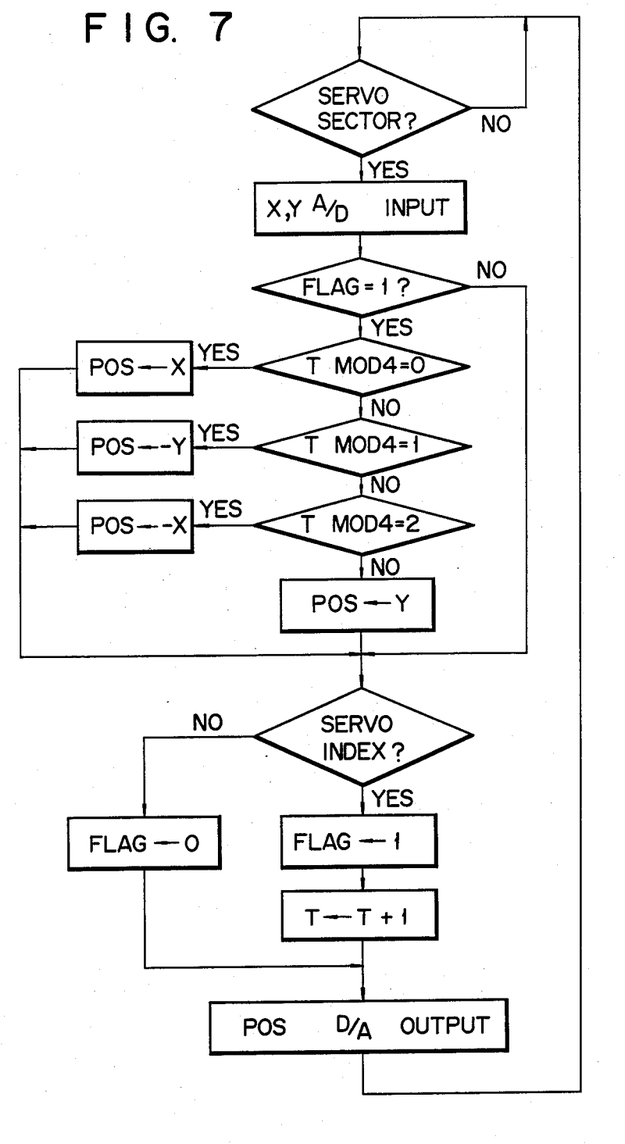
FIG. 7 shows a flowchart of the head spiral tracking operation performed by the device shown in FIG. 4.

Referring to FIG. 7, the operation in the spiral mode in which the head spirally traces the track will be described. In the first step, CPU 25 checks if the head is positioned on the servo sector. If the answer is YES, position signals X and Y are read into CPU 25 through A/D converter 24. A check is then made as to whether or not Flag=1, i.e. whether or not the servo index pattern existed in the previous servo sector. If the answer is YES, the TMOD4 operation is peformed. Through this operation, the remainder of a division of the track number by 4 is obtained. For example, when the track number=4N, 4N+1, 4N+2, or 4N+3, TMOD4=0, 1, 2 or 3. Through this operation, the track on which the head is positioned is determined from four tracks within one four-track period.

When TMOD4=0, TMOD4=1, TMOD4=2, and TMOD4=3, as seen from FIG. 6, position signals −Y, −X and Y are prepared in CPU 25 for the spiral tracking control of the head. In the flowchart in FIG. 7, this is expressed by POS←−X. If the servo index pattern was not present in the previous servo sector, or after the position signal to be used has been determined, it is checked as to whether or not the servo index pattern is present in the present servo pattern. When the servo index pattern is detected, 1 is set to Flag and the target track number T is incremented by one in CPU 25. When the servo index pattern is not detected, 0 is set to Flag. Then, CPU 25 produces a position signal through D/A converter 27. The operation then returns to the first step.

As seen from the flowchart of FIG. 7, when the servo index pattern is detected in servo sector Sm, the position signal is prepared according to the track number of the track on which the head is positioned. In the first servo sector, the target track number is increased. The selected position signal is applied to the head drive control mechanism so that the head stably traces the adjacent track.

What is claimed is:

1. A disk adapted for writing and reading information through a read/write head, comprising:
   a plurality of data sectors each having spiral data tracks and first to m-th servo sectors each having spiral servo tracks and located between adjacent data sectors, said spiral data tracks in said data sectors and said spiral servo tracks in said servo sectors having a substantially equal track pitch, and said spiral servo tracks in each of said servo sectors being displaced from said data tracks in an adjacent data sector by half the track pitch;
   a servo index zone formed in association with said m-th servo sector of said disk for providing a reference position on said disk; and
   predetermined servo patterns formed in each of said servo sectors in the radial direction of said disk and adapted for positioning said head on said disk, said servo patterns each having a period which is an integral multiple of the pitch of said servo tracks, phases of said servo patterns with respect to said servo tracks in said servo sectors being sequentially displaced, from said first servo sector to said m-th servo sector, substantially by a value obtained by dividing the servo track pitch by the number m of said servo sectors.

2. The disk according to claim 1, in which said servo index zone is formed in said m-th servo sector in a magnetically detectable configuration.

3. The disk according to claim 1, in which said servo index zone is formed in association with said m-th servo sector in an optically detectable configuration.

4. The disk according to claim 1, in which said servo patterns include a first servo pattern adapted for head speed control and a second servo pattern adapted for head positioning control.

5. The disk according to claim 4, in which said second servo pattern is formed of a 2-phase dibit pattern having a period of four tracks.

6. A disk device used for a disk, said disk comprising a plurality of data sectors each having spiral data tracks and first to m-th servo sectors each having spiral servo tracks and located between adjacent data sectors, said spiral data tracks in said data sectors and said spiral servo tracks in said servo sectors having a substantially equal track pitch, and said spiral servo tracks in each of said servo sectors being displaced from said data tracks in an adjacent data sector by half the track pitch, a servo index zone formed in association with said m-th servo sector of said disk for providing a reference position on said disk, and 2-phase dibit servo patterns formed in each of said servo sectors in the radial direction of said disk and having a period of four tracks, said servo patterns in each of said servo sectors being from one another by one track pitch, and phases of said servo patterns in servo sectors with respect to said servo tracks being sequentially displaced, from said first servo sector to said m-th servo sector, by a value obtained by dividing the servo track pitch by the number m of said servo sectors so that the phases of said servo patterns are displaced one track pitch for each revolution of said disk, said disk device causing a read/write head to trace a spiral track on said disk, comprising:
   servo sector detecting means for detecting each of said servo sectors in response to an output signal of said read/write head;
   servo index detecting means for detecting said servo index on said disk in response to said detecting means and the output signal of said head;
   servo information extracting means for extracting servo information signals corresponding to said 2-phase dibit patterns in each of said servo sectors in response to the output signal of said read/write head and said servo sector detecting means;
   position signal forming means connected to receive the servo information signals from said servo information extracting means for forming first and second position signals of different phases and having a period of four tracks; and
   head drive control means for causing said read/write head to track said spiral data tracks in response to said servo index detecting means and the first or second position signal from said position signal forming means, said head drive control means being arranged to switch a position signal used in head movement control after said servo index is detected by said servo index detecting means.

* * * * *